(No Model.)

ST. GEORGE T. C. BRYAN.
MANUFACTURE OF SLAG.

No. 400,048. Patented Mar. 26, 1889.

WITNESSES
H. C. Newman,
O. S. Newman.

INVENTOR
St. George T. C. Bryan,
By his Attorney
Marcus S. Hopkins.

UNITED STATES PATENT OFFICE.

ST. GEORGE T. C. BRYAN, OF BIRMINGHAM, ALABAMA.

MANUFACTURE OF SLAG.

SPECIFICATION forming part of Letters Patent No. 400,048, dated March 26, 1889.

Application filed July 26, 1888. Serial No. 281,094. (No model.)

*To all whom it may concern:*

Be it known that I, ST. GEORGE T. C. BRYAN, of Birmingham, in the county of Jefferson and State of Alabama, have invented a new and useful Manufacture of Floors, Pavements, Walls, &c., from Slag, of which the following is a specification, reference being had to the accompanying drawings.

To carry out my invention, I produce masses of slag in part cellular and in part solid. From such slag blocks can be cut (or they may be molded) of any required dimensions, either cellular or solid, or each in part cellular and in part solid, for the manufacture of floors, pavements, walls, &c. These blocks of slag may be used alone, or they may form a base to receive a covering of cement or other suitable plastic or mobile substance which will adhere to the slag and become hard.

The advantage of using cellular slag as I manufacture it is that it is a uniform, light, strong, elastic, durable substance, readily molded, and also easily cut or sawed, for the purposes of making pipe, blocks for paving or building, &c. These, before or when laid in place, may be covered with any substance that will enter the pores, and thus form a perfect bond with and also furnish a protection and finish to the surfaces of the slag when desired. By means of the cells which contain the cement two closely-fitting surfaces of porous slag may be firmly united with one another without necessarily any intervening space for the cement. It is a matter of great importance that the bond and fixedness between the upper or outer layer (material used to cover the slag) and the base or substructure be as intimate as possible. According to my invention such bond is made more intimate and fixed than is the union of any other form of stone, block, or other solid base not fused with a plastic or mobile covering that I am aware of, for the cell structure offers the greatest exposed surface of slag for bond with the cement or other matter covering it. It also permits the cement by filling the exposed cells to form part of the original body of the mass, and gives to the surface greater strength and lasting quality.

Figure 1:
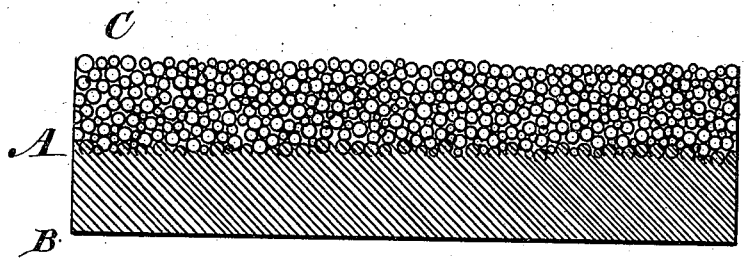
Figure 2:
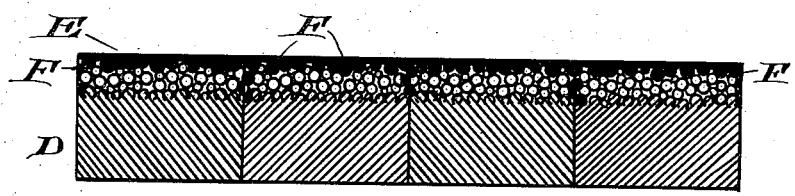
Figure 3:

In the accompanying drawings, Figure 1 represents a mass of slag solid in its lower part and cellular in its upper part. Fig. 2 is a sectional view of a pavement or wall made from blocks cut from said mass of slag and covered with cement or other plastic substance. Fig. 3 shows two pieces of cellular slag placed in contact and united by a bond of plastic substance at F.

Referring to the letters upon the drawings, A in Fig. 1 indicates a mass of slag solid at the base B and cellular in its upper part, C. Such a mass of slag may be molded in any desired form, or it may be cast in bulk and then sawed into any desired form.

In order to make a mass or block of slag solid in one part and cellular in another there are several methods which may be practiced, some of which I will mention.

First. Slag in part solid and in part cellular may be produced by discharging upon molten or semi-molten or heated solid slag molten cellular slag, the conditions of fusion and temperature being such that union will take place between the surfaces of these masses.

Second. Slag in part solid and in part cellular may be produced through the action of centrifugal force, in which, by revolving or rotating the vessel or mold containing cellular slag, or by rotation of the slag in the vessel or mold, it will, because of its superior weight and density under the influence of centrifugal force, displace the gas or vapor cells near to the walls of the containing-vessel and make a solid exterior crust.

Third. Slag in part solid and in part cellular may be produced by discharging molten slag into a vessel or mold, which may contain, in addition to its confining walls, partitions, all of which may be solid or hollow, fixed or movable, and which may be heated as desired and found best. The exterior or containing walls serve the purpose, in connection with the interior partitions, of chilling and making solid the contiguous portions of the slag. The molten slag discharged into such a vessel or mold may be allowed to chill, forming a solid crust on all the walls before the interior slag is made cellular by blowing or liberating vapor, gas, &c., into it and intermingling it through the molten mass.

Fourth. Slag in part solid and in part cellular may be produced by discharging cellular slag, made so by gaseous or vapor expansion in the molten mass, into a mold when the viscid condition of the slag is such as to in a slight degree allow the upward rise of the gas or vapor cells and the subsidence of solid slag, by which means the bottom will become solid and the upper portion remain cellular.

In Fig. 2 D indicates a base of slag, and E a plastic covering. At F is seen how the plastic substance penetrates the cells of the slag and forms a bond, as if the two parts were bolted together. This advantage applies to floors, walls, and pavements alike.

Blocks of slag partly solid and partly cellular may of themselves form an excellent pavement, the cellular part serving to lighten the blocks and render their transportation and handling convenient, and the solid part may form a surface offering greater resistance to wear and breakage, and being smoother for the purposes, for example, of a footwalk. It will be practicable to color the solid surfaces of such blocks and use them for either exterior or interior finish of building-walls.

Having described my invention, what I claim, and desire to secure by Letters Patent, is—

1. As a new article of manufacture, an artificial paving or building block of slag made in part solid and in part cellular, substantially as set forth.

2. The combination, with a cellular artificial block of slag made for paving or building purposes, of a plastic substance or covering forming a bond with the slag by entering its cells, substantially as set forth.

In testimony of all which I have hereunto subscribed my name.

ST. GEORGE T. C. BRYAN.

Witnesses:
JOSEPH L. ATKINS,
EMMA M. GILLETT.